May 29, 1951  A. GIORGI  2,555,079

FRICTION SPEED GEAR

Filed Nov. 15, 1946

Inventor:
Antonio Giorgi
per Fred F. Barker
Attorney

Patented May 29, 1951

2,555,079

UNITED STATES PATENT OFFICE 2,555,079

FRICTION SPEED GEAR

Antonio Giorgi, Milan, Italy

Application November 15, 1946, Serial No. 709,834
In Italy November 23, 1945

2 Claims. (Cl. 74—199)

This invention relates to a continuously acting progressive friction speed gear which consists substantially of two pairs of coned discs, the conical surfaces of each pair being kept pushed the one towards the other by a suitably applied elastic action in accordance with the average power to be transmitted and which may give a multiplication or a reduction of the speed.

A connecting device is provided which transmits the rotating motion of the driving pair of conical discs (one at least of which is keyed to the driving shaft but preferably both) to the driven pair of conical discs attached in an analogous manner to the driven shaft. This transmitting device preferably is comprised by a cylindrical disc the two flat surfaces of which are simultaneously in frictional engagement, by their peripheries, with the conical surfaces of the driving cones, and also at the same time, in a diametrically opposite position, in frictional engagement with the conical surfaces of the cones to be driven.

The transmitting device is mounted to move or slide by means which cause its shaft to move parallel to itself. In this way the gear ratio will continuously and progressively or regressively be caused to vary, it being understood that the axes of the driving shaft and the driven shaft are parallel to each other as well as parallel to that of the shaft of the transmitting device.

To carry out a variation of the gear ratio it is necessary to vary, whilst still keeping the axes of the various shafts parallel, the distance between the axis of the transmitting device and the two other axes. In some respects, the most favourable solution is when all three axes come in the same plane but this is not necessary as the axis of the transmitting device may come in a plane displaced out of the plane of the other two axes. In practice, the distance variations between the axes of the driving and driven shafts in relation to the axis of the shaft of the transmitting device, which latter is disposed in a position intermediate the two former, is obtained by moving the axis of the shaft of the transmitting device while the other axes remain fixed, although in some cases the axis of the shaft of the transmitting device may be fixed and the other axes movable.

The shifting of the transmitting device axis towards the axis of the driving shaft effects a gearing-down of the transmitted speed, and the shifting of the axis of the transmitting device towards the driven shaft effects of gearing-up of the transmitted speed. The variation of the gear ratio is related to the square of the linear shifting movements above explained and as a consequence through micrometric mechanism associated with the transmitting device large ratio variations will be produced.

In the embodiment of the invention herein described, the shifting movements are effected by carrying the axis of the transmitting device on a lever system pivoted at one end about a fixed axis whilst the other end is carried by a nut engaged by a screwed spindle rotated by means of a hand wheel but held from axial movement. To reduce the friction as well as the wear of the edges and surfaces in frictional driving or driven contact, it is preferred to increase the pairs of conical discs by additional coaxial pairs of conical discs with interposed springs to compensate for the variation in friction pressures. In this manner the adherence friction between the different pairs of conical discs and the transmitting device will be the same as the adherence friction between the transmitting device and the different conical discs supported by the driving shaft; moreover, at each such individual driving contact point the value of the frictional adhesion will be the same.

The accompanying drawings show an embodiment of the invention having four pairs of conical discs, namely two pairs on the driving shaft and two pairs on the driven shaft with the interposition of one cylindrical transmitting disc for each two pairs of conical discs (one pair on the driving shaft and one pair on the driven shaft).

In connection with the drawings, the continuous speed variation device shown therein consists of friction discs all controlled positively by the driving shaft and composed by four pairs of conical discs, A—B and C—D, with facing conical surfaces and the members of each pair pushed the one towards the other by the stress of helical compression springs E. The centrally situated springs act at the same time on the disc B of one pair and on the disc A of the other pair located on the driving shaft F and on the disc D of one pair and the disc C of the other pair on the driven shaft G; both the driving and driven shafts have splines or keyways for the engagement of the conical discs.

Between the pairs of conical discs A—B on the driving shaft F and the conical discs C—D on the driven shaft G, there are interposed the transmitting discs H each of which is engaged by four conical discs, that is to say, by a pair of conical discs on the driving shaft and a pair of conical discs on the driven shaft, the whole in such manner that the driving shaft F can transmit its power to the driven shaft G.

The pressure of the springs E pushes the conical discs of each pair A—B and C—D the one towards the other, the discs sliding on the driving or driven shaft as the case may be. The above pressure consequently also holds the cylindrical disc D in a steady manner in the somewhat V gaps formed between the pairs of discs, so that the consequent frictional grip is sufficient to transmit the power from the driven to the driving shaft.

Figure 1:
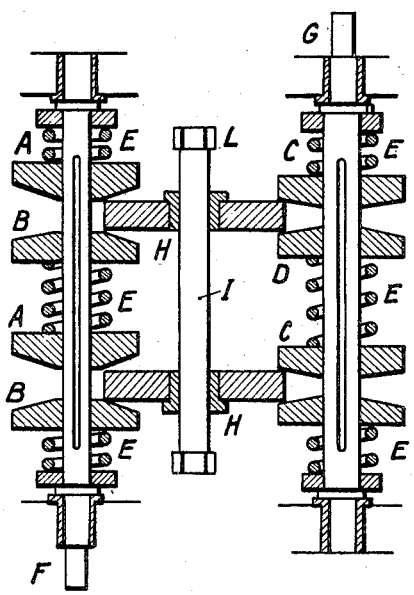
Fig. 1 is a somewhat diagrammatic cross-sectional plan of the gear taken in a general plane which includes the axes of the driving and driven shafts, showing the transmitting discs shifted towards the driving shaft, that is to say in the condition where the parts act as a speed reducer.

In the position shown by Fig. 1 the transmitting discs H are pushed towards the driving shaft F and away from the driven shaft G. The two discs of each pair of discs A—B on the driving shaft are separated from each other and consequently the pressure of the springs E is increased whilst the two discs of each pair of discs C—D on the driven shaft are brought nearer to each other and consequently the pressure of the springs E is decreased.

In the position shown in Fig. 1 the discs H rotate on a circle of small diameter near the apices of the conical discs A—B on the driving shaft F and on a larger diameter near the bases of the conical discs C—D on the driven shaft G. The speed of the driven shaft G therefore will diminish, or in other words the device will work as a speed reducer.

Figure 2:
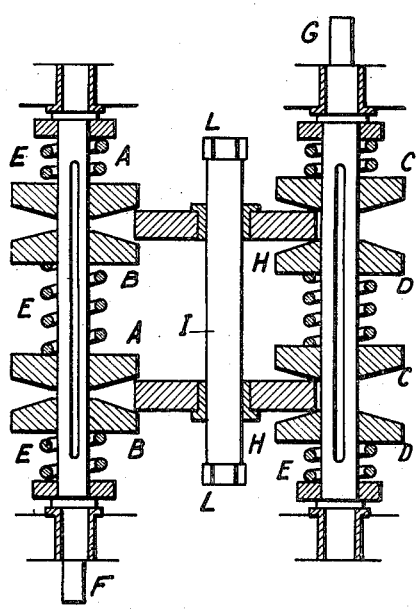
Fig. 2 shows a similar view of Fig. 1, but the transmitting shaft is moved towards the driven shaft, that is, in the condition of acting as a speed multiplier.

In the position shown in Fig. 2, the transmitting discs H are pushed towards the driven shaft G and away from the driving shaft F and the opposite result is obtained. There will be an increased speed because the transmitting discs H will rotate on the bases of the conical discs A—B of the driving shaft F where the diameter is larger and will rotate towards the apices of the conical discs C—D of the driven shaft G whose diameter is smaller; the device therefore works as a speed multiplier.

Figure 3:
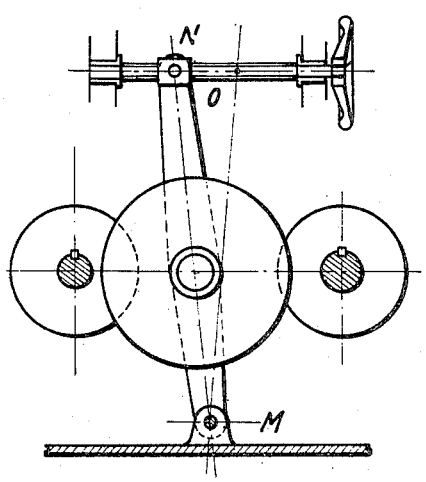
Fig. 3 shows a somewhat diagrammatic side elevation of Fig. 1 coupled with the control gear.
Figure 4:
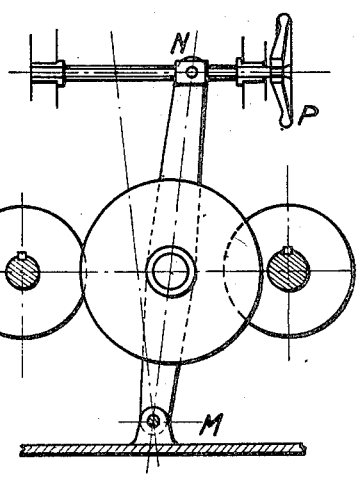
Fig. 4 shows a view similar to Fig. 3 but of Fig. 2.

The transmitting discs H rotate on a spindle I mounted in a lever system L the axis of which is located in the point M (Figs. 3 and 4) to permit the transmitting disc to be shifted freely towards both the driving shaft F and the driven shaft G. Acting as above, a diminishing as well as an increasing of the driven shaft speed can be obtained accordingly. The shifting movement is realised by means of a nut N engaged with a screwed spindle O held from axial movement but rotatable by a hand wheel P.

The whole system is housed in a metal casing, preferably of aluminium, forming a rigid support for all the moving parts which where requisite are mounted in ball bearings. The conical discs A—B and C—D as well as the transmitting discs are of best special converted, tempered and rectified steel, running in an oil bath contained in the casing.

The variation device can rotate in both directions. The elastic system constituted by the springs E, which has been chosen, permits the mounting of a greater number of pairs of conical discs A—B and C—D on the driving and driven shafts respectively, as well as a greater number of transmitting discs H on the spindle I, to permit high powers to be transmitted, which is not possible with other already known systems applied for the same purposes.

The elastic system of springs E which regulates the contact adhesion between the conical discs A—B and C—D and the transmitting discs H, gives the advantage of an increased adhesion by friction when the radius of rotation becomes small whilst the peripheric strain increases. Similarly, the adherence as well as the friction will diminish with an increased radius of rotation and smaller peripheric strain. This makes for slight wear and tear of the device and gives longer life and great efficiency.

As will be realised, the above-described speed gear gives the advantage of eliminating belts, chains, flat discs and the like as generally adopted in other speed variation systems having pairs of conical discs in co-operation with transmitting parts consisting of rollers or chains.

The invention is not limited to the precise forms or details of construction herein described, as these may be varied to suit particular requirements.

What I claim and desire to secure by Letters Patent of the United States of America is:

1. A progressive friction speed gear comprising two main shafts, a plurality of similar pairs of cone discs slidably carried in sequence by and rotatably rigid with each shaft, the number of pairs on each shaft being the same and the cone discs of each pair having their conical surfaces facing one another, a coil spring inserted between the outer surface of each disc of each pair and the outer surface of the disc of the adjacent pair facing the outer surface of the first disc considered, a collar rigid with each end of each main shaft at either end thereof, further coil springs inserted between the inner surface of each collar and the outer surface of the outer disc of the pair of discs nearest said collar, an auxiliary shaft parallel with the two main shafts and between same and lying substantially in the plane thereof, means for shifting said auxiliary shaft substantially in the plane of the two first shafts, substantially flat discs rigid with said auxiliary shafts and the number of which is equal to that of the pairs of discs on either of the main shafts, said discs being adapted to engage operatively the cooperating conical surfaces facing one another in the corresponding pair of discs on each main shaft, the location of said auxiliary shaft with reference to the main shafts defining the radius of contact of the discs on either shaft with the outer operative edge of the flat disc considered.

2. A progressive friction speed gear comprising two main shafts, a plurality of similar pairs of cone discs slidably carried in sequence by and rotatably rigid with each shaft, the number of pairs on each shaft being the same and the cone discs of each pair having their conical surfaces facing one another, a coil spring inserted between the outer surface of each disc of each pair and the outer surface of the disc of the adjacent pair facing the outer surface of the first disc considered, a collar rigid with each end of each main shaft at either end thereof, further coil springs inserted between the inner surface of each collar and the outer surface of the outer disc of the pair of discs nearest said collar, an auxiliary shaft parallel with the two main shafts and between same and lying substantially in the plane thereof, an arm pivotally carrying said auxiliary shaft and a screw and nut arrangement for controlling the displacement of said arm in a plane perpendicular to the two main shafts for shifting the auxiliary shaft substantially in the plane of said main shafts substantially flat discs rigid with said auxiliary shafts and the number of which is equal to that of the pairs of discs on either of the main shafts, said discs being adapted to engage operatively the cooperating conical surface facing one another in the corresponding pair of cone discs on each main shaft, the location of said auxiliary shaft with reference to the main shafts defining the radius of contact of the discs on either shaft with the outer operative edge of the flat disc considered.

ANTONIO GIORGI.

REFERENCES CITED

The following references are of record in the file of this patent:

UNITED STATES PATENTS

| Number | Name | Date |
|---|---|---|
| 1,802,484 | Small | Apri. 28, 1931 |

FOREIGN PATENTS

| Number | Country | Date |
|---|---|---|
| 100,177 | Germany | Jan. 6, 1899 |
| 257,792 | Great Britain | Sept. 9, 1926 |
| 671,240 | France | Aug. 31, 1929 |